United States Patent [19]

Redding

[11] Patent Number: 4,592,069

[45] Date of Patent: May 27, 1986

[54] LINE POWERED MODEM

[76] Inventor: Robert J. Redding, September House, Cox Green La., Maidenhead, Berkshire, SL6 3EL, United Kingdom

[21] Appl. No.: 578,062

[22] Filed: Feb. 8, 1984

[30] Foreign Application Priority Data

Feb. 10, 1983 [GB] United Kingdom ................. 8303631
Oct. 10, 1983 [GB] United Kingdom ................. 8326997

[51] Int. Cl.$^4$ ........................................... H04M 19/00
[52] U.S. Cl. ...................................... 375/8; 179/2 C; 333/215; 340/310 R; 375/36
[58] Field of Search ................. 333/214, 215; 179/170 J, 2 R, 2 DP, 2 BC, 2 C; 340/310 R, 310 A; 375/7, 8, 36; 455/602; 361/77, 86, 88; 330/207 P; 307/2

[56] References Cited

U.S. PATENT DOCUMENTS

| | | | |
|---|---|---|---|
| 3,517,342 | 6/1970 | Orchard et al. | 333/215 |
| 3,647,982 | 3/1972 | Puije | 333/215 |
| 3,742,450 | 6/1973 | Weller | 179/170 J |
| 3,835,399 | 9/1974 | Holmes | 333/314 |
| 4,034,168 | 7/1977 | Brown | 361/77 |
| 4,126,793 | 11/1978 | Vries | 340/310 A |
| 4,272,758 | 6/1981 | Giraud | 340/310 A |

Primary Examiner—Benedict V. Safourek
Attorney, Agent, or Firm—Klarquist, Sparkman, Campbell, Leigh & Whinston

[57] ABSTRACT

A modem or other data handling apparatus for connection to a transmission line includes an inductance simulation circuit for providing a low d.c. resistance to allow circulation of a line holding current, whilst presenting a high a.c. shunt impedance to the audio data tones on the line. The simulation circuit comprises two tranistors connected as a high gain amplifier across an input resistor in the modem/line coupling circuit amplifier via a capacitor and the amplifier applies tone signals across the input resistor to augment the tones thereacross. The conductive transistors also act as a low resistance connected across the input resistor for the passage of the line holding current. The simulation circuit acts, in effect, as an inductance, without the use of inductive components. The input resistor is effectively connected, in series with two zener diodes, across the line, and the series circuit receives the line voltage and produces therefrom positive and negative power supplies for energizing the entire modem. No further power supply is necessary.

14 Claims, 3 Drawing Figures

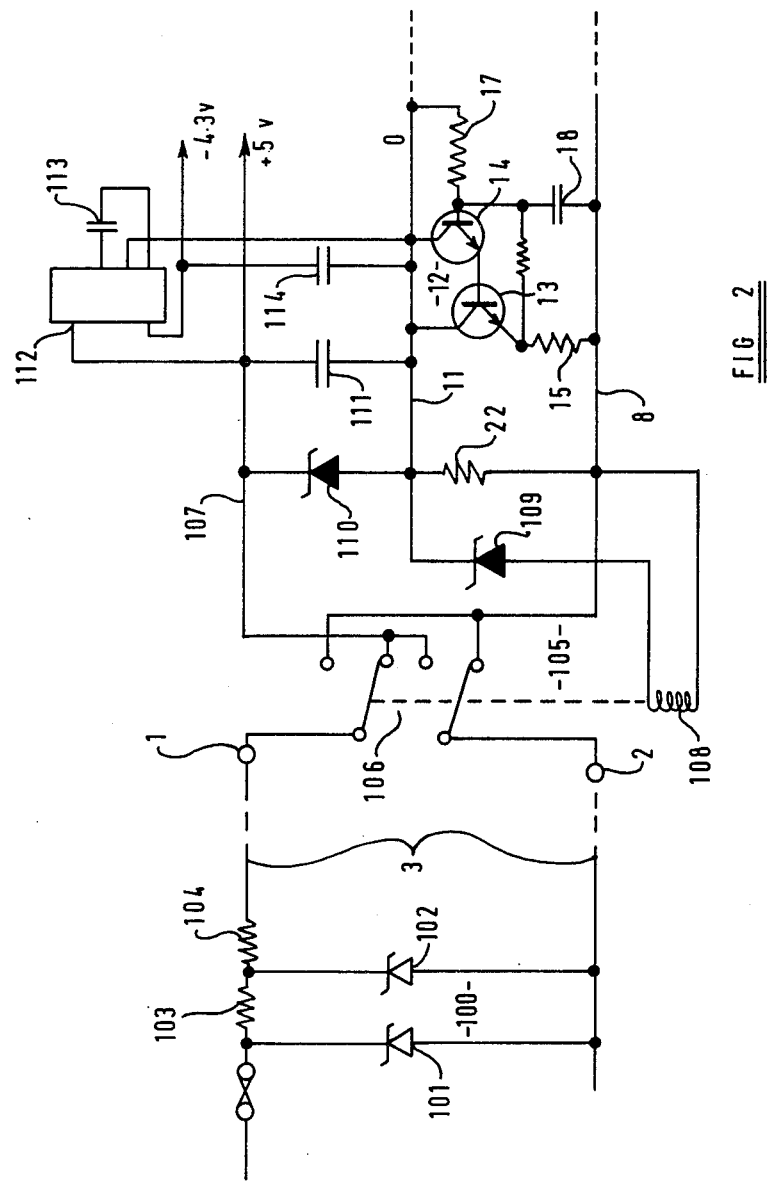

4,592,069

LINE POWERED MODEM

BACKGROUND OF THE INVENTION

This invention relates to a line-powered modem or other data handling apparatus including an inductance simulating circuit for exhibiting a relatively low resistance to direct current flow therethrough and a relatively high impedance to alternating signals applied thereto, without the use of an inductive component.

Modems are well known for use as interfaces between digital data equipment and transmission lines, such as telephone lines. They turn input data into frequency shift keyed (FSK) signals comprising tones which are within the frequency domain of the transmission line, and conversely translate FSK signals, received from the transmission line, into digital data.

The advent of the microcomputer has led to a considerable increase in the number of modems required. Such microcomputers are now widely used, for example as home computer equipment, in process control and in the monitoring of operating parameters in industrial plant, and communication over a telephone line, or other transmission line, to and from a remote location is frequently required. The apparatus connected to the line may be operating in a hazardous atmosphere or location, making it essential that all powered circuits are intrinsically safe, i.e. under any normal or faulty operating condition they cannot produce a spark of sufficient energy to ignite the atmosphere.

However, modems are currently too complicated and expensive, and suffer from a number of other disadvantages. Firstly the standard signal format used for communication requires a signal of ±12 volts, which is not available in a home computer, because the power supply is normally only 5 volts d.c. Secondly, a modem (and other equipment) which is to be connected to a telephone line is required by the telephone system operating authorities in many countries to be approved to ensure that it cannot apply dangerous voltages or spurious signals to the telephone system. This involves expensive type-approval tests and subsequent closely controlled manufacture. Thirdly, a power supply is normally required to power the modem, and this will greatly increase the size of the modem structure. Furthermore, the modem power unit must be intrinsically safe if the equipment is to be used under hazardous conditions.

Fourthly, if a loop current has to circulate in the line and in the modem to hold in a line selector relay, then two conflicting requirements have to be met, namely that the modem input circuit must have a low d.c. resistance to allow circulation of the current, and must also have a high a.c. impedance, preferably matched to that presented by the line, to allow reception of tones from the line. A transformer or other inductive component can fulfil both of these requirements, but such components are large, and therefore difficult to accommodate, and also hamper the provision of a single integrated circuit to perform all of the modem functions. Furthermore, such a component may store an appreciable quantity of energy, thereby creating a potential danger.

SUMMARY OF THE INVENTION

It is an object of the present invention to provide a circuit which will simulate the above-mentioned inductive component, thereby avoiding the need to use an actual inductive component.

According to the invention, an inductance simulation circuit to be connected to a transmission line providing a line-holding direct current and carrying alternating data signals, the circuit being operative to exhibit a relatively low resistance to direct current flow between two points in the circuit whereby a d.c. power supply for energising data handling apparatus can be derived from said direct current flow and to exhibit a relatively high impedance for alternating signals occuring between those points, comprises resistance means connected between the points, and an amplifier circuit connected across the resistance means to provide a low resistance d.c. path in parallel with the resistance means and operative to amplify the alternating signals and to apply the amplified alternating signals across the resistance means in a phase such that the amplifier circuit simulates an inductance connected across the points.

BRIEF DESCRIPTION OF THE DRAWINGS

Embodiments of the invention will now be described, by way of example, with reference to the accompanying drawings, in which:

FIG. 2 is a schematic diagram of a modification of part of the modem of FIG. 1.

DESCRIPTION OF THE PREFERRED EMBODIMENTS

Figure 1A:
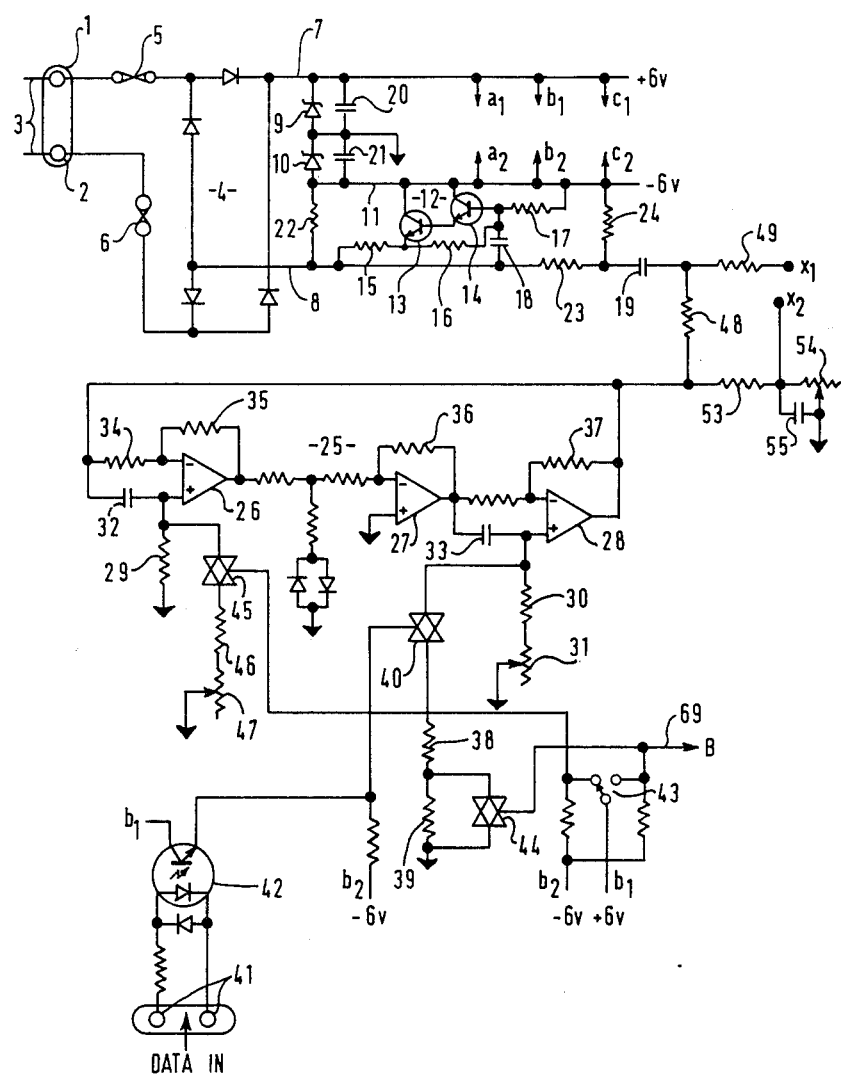
FIGS. 1A and 1B in conjunction form a circuit diagram of a modem including an inductance simulation circuit in accordance with the invention.
Figure 1B:
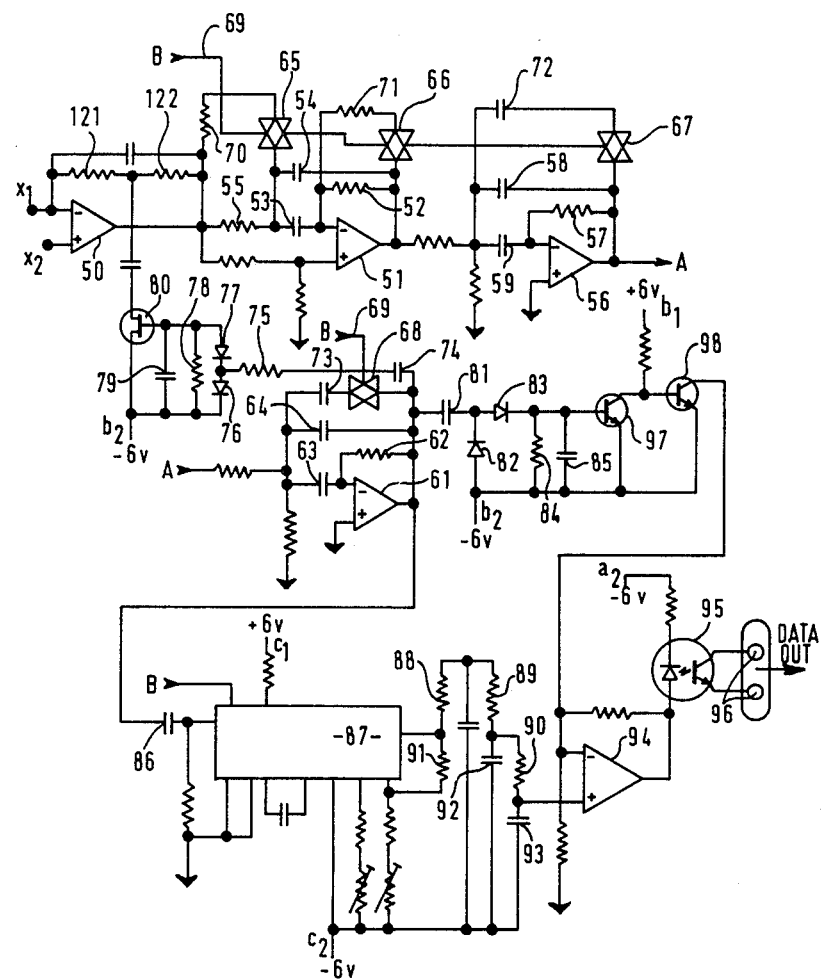

Referring to FIGS. 1A, 1B of the drawings, the circuits shown respectively are connected at the points $X_1$, $X_2$ and show a modem incorporating the present invention has terminals 1 and 2 to be connected to a 600 ohm transmission line 3, such as a telephone line, to which a 50 volt d.c. supply (not shown) is connected, at a remote position, when the line is in use. A diode rectifier bridge 4 is connected to the terminals 1 and 2 via fuses 5 and 6, and provides a d.c. output such that lines 7 and 8 connected thereto become positive and negative, respectively, irrespective of the polarity of the voltage on the line 3. Two 6.2 volt zener diodes 9 and 10 are connected in series between the line 7 and a line 11, the anode of the diode 9 and the cathode of the diode 10 being connected together and grounded. An inductance simulator 12 having a low d.c. resistance is connected between the lines 8 and 11 so that current flow through the zener diodes 9 and 10 and the simulator 12 from the diode bridge 4 causes the lines 7 and 11 to set substantially at +6 volts and −6 volts, respectively, relative to ground. Smoothing capacitors 20 and 21 of large capacitance values, such as 220 microfarads, are connected across the diodes 9 and 10, respectively.

These ±6 volt rails are used to supply power to the remainder of the modem. Hence, all of the power required by the modem is obtained from the line 3.

The simulator 12 comprises an amplifier means which takes the form of two npn transistors 13 and 14, the collector electrodes of which are connected to the line 11. The emitter of the transistor 14 is connected to the base electrode of the transistor 13, the emitter of the transistor 13 is connected to the line 8 via a resistor 15 and to the base of the transistor 14 via a resistor 16. The base of the transistor 14 is connected to the line 11 via a resistor 17 and to the line 8 via a capacitor 18. The transistors 13 and 14 may comprise a Darlington pair. A resistor 22 is connected between the line 8 and the line 11.

Audio tones can pass to and from the line 3 via a capacitor 19 and a pi-section attenuator comprising the shunt resistor 22, a series resistor 23 and another shunt resistor 24. The resistor 23 is connected between the line 8 and the capacitor 19, and the resistor 24 is connected between the line 11 and the junction of the resistor 23 and the capacitor 19.

The simulator 12 operates in the following manner. The resistor 22, which has a relatively high resistance value, for example 1200 ohms, is effectively in series with the zener diodes 9 and 10. Such a resistance would be too high to allow the required ±6 volt power supplied to be produced from the 50 volt supply on the line 3. Thus, if the loop current required to hold the line were 35 mA, the voltage drop across the 1200 ohm resistor 22 would be 42 volts, leaving only 8 volts across the zener diodes. The resistance value would, therefore, have to be much lower as far as the d.c. is concerned. Moreover, since the series circuit comprising the resistor 22 and the zener diodes 9 and 10 is effectively connected across the line 3, a low resistance path through that circuit would shunt the required audio tones forming the incoming and outgoing signals. From the point of view of these tones, the resistance of the resistor 22 should therefore be large.

These conflicting requirements are dealt with by the simultor circuit 12 which simulates, between the lnes 8 and 11, a large inductance having a low d.c. resistance. The transistors 13 and 14 are held conductive due to the configuration of the resistor circuit 17, 16, 15 which biases the base of the transistor 14. This ensures that the d.c. path between the line 8 and the zener diodes 9 and 10 has a low d.c. resistance, so that the voltage drop across that path can be less than 4 volts. The tones on the line 8 are fed to the base of the transistor 14 via the capacitor 18 and are amplified by the transistors 14 and 13, which together have a very high gain. The effect of this is to apply an amplified tone signal across the resistor 22 so that it appears as though there is a large a.c. impedance connected between the lines 8 and 11, and hence across the line 3. This impedance, ideally matching the line impedance, does not, therefore reduce the received or transmitted tones. The effect of a large inductance is achieved without the use of an inductive component.

Although two transistors 13 and 14 are used in the above described simulator, more than two transistors in cascade, or a very high gain transmitter, may alternatively be used.

The tones for feeding out to the line 3 are generated in a phase-shift sine wave oscillator 25 comprising three operational amplifiers 26–28 with associated resistors 34–37. Further tuning resistors 38 and 39 can be connected across the resistors 30 and 31 by operation of an analog solid state switch 40. The switch 40 is opened and closed in accordance with digital data which are fed to data input terminals 41 from a source (not shown) of serial data, such as a computer. The data is fed through an opto-coupler 42 to the control electrode of the switch 40. The opto-coupler isolates the data input terminals from the rest of the modem as regards spurious a.c. or d.c. voltages, to ensure that unwanted and potentially dangerous voltages cannot be fed to the modem and thence to the line 3.

When the switch 40 is closed, the resistors 38 and 39 are connected across the resistors 30 and 31 thereby decreasing a time constant in the oscillator circuit and increasing the output frequency. A manually operated switch 43 can be set in an "Answer" position as shown, or in an "Originate" position for setting up a call originating from the data handling apparatus connected to the modem as distinct from answering a call.

The frequency pair representing '0' and 1-bits may be higher for the answering mode, say 1850 Hz and 1650 Hz than for the originating mode, say 1180 Hz and 980 Hz.

Thus, for the answering mode and switch 40 is closed, frequency in this condition may be 1850 Hz, representing a 0-bit (i.e. a space) for answering an incoming call. When the switch 40 is open, the resistors 38 and 39 are ineffective, so that the time constant is increased, whereby the oscillator produces a tone of 1650 Hz, representing a 1-bit (i.e. a mark).

In the "Originate" position, a further switch 44 is closed, so that the resistor 39 is shorted out. This means that when the switch 40 is closed, in response to a binary 0 input on the terminals 41, only the resistor 38 is connected across the resistors 30 and 31. Hence the effective resistance in that time constant circuit of the oscillator 25 is lower and frequency generated higher than when the switch 44 is open, but lower (say 1180 Hz) than in the "Answer" position of switch 43. The switch 43 also controls a further switch 45 so that the latter is closed in the "Answer" position and open in the "Originate" position. The switch 45, when open, removes the connection of resistors 46 and 47 across the tuning resistor 29, and so enables production of a tone which is of still lower frequency (say 980 Hz) for a binary 1 input in the "Originate" mode.

The frequency shift keying (FSK) signal, which is thereby produced in response to data at the terminals 41, is fed from the oscillator 25 to the capacitor 19 via a resistor 48, and thence to the line 3 via the attenuator 22, 23, 24.

When the data tones are being received from the line 3, the tones are passed through the attenuator 22, 23, 24, through the capacitor 19, and through a resistor 49 to the inverting input of an operational amplifier 50. The amplifier 50 is a variable-gain stage having feedback resistors 121 and 122, the effective resistance of which is varied in accordance with the received signal level, as will be described later.

The line 3, the resistor 48, a resistor 53 connected to the non-inverting input of the amplifier 50, and a variable resistor 54, together form a bridge. In effect, the tones generated by the oscillator 25 are fed across one diagonal of the bridge, and the two inputs of the amplifier 50 are connected across the other diagonal. The bridge is balanced by adjustment of the resistor 54, and by a capacitor 55 connected across that resistor. The latter capacitor helps to balance the reactance of the line 3. In this bridge, tones generated by the oscillaotr 25 for transmission are substantially cancelled so that they do not reach the amplifier 50, whereas tones which may be arriving simultaneously from the line 3 in duplex operation of the modem are fed, substantially unaffected, to that amplifier.

The output of the differential amplifier 50 is fed to an amplifier 51 which, with associated tuning components 52–55, forms a notch filter which is tuned to the frequency of the tones generated and transmitted by the oscillator 25. This filter further reduces any residual transmitted tones which may enter this receiver part of the modem.

The received signal is then passed to a further amplifier 56 which, with the associated tuning components 57-59, constitutes a bandpass filter which is tuned to the upper end of the received frequency band. A further amplifier 61 and associated tuning components 62-64 act as a bandpass filter which is tuned to the lower end of the received frequency band.

Switches 65 and 66 controlled by the switch 43 over a line 69, can be closed to connect resistors 70 and 71 across the tuning resistors 55 and 52 respectively, of the amplifier 51. Switches 66 and 67 also controlled by the switch 43 via line 69 can be closed to connect capacitors 72 and 73 across the tuning capacitors 58 and 64 respectively, of the amplifiers 56 and 61, so that the receiving circuits can be tuned for incoming signals in the "Answer" mode or the "Originate" mode, as required.

The filtered received signal is then fed through a capacitor 74 and a resistor 75 to a rectifier circuit comprising diodes 76 and 77, a resistor 78 and a capacitor 79. This circuit produces a negative d.c. potential, the level of which is dependent upon the magnitude of the received signal. This potential is fed to the gate of a field effect transistor 80 and reduces the source-to-drain resistance of that transistor, thereby permitting increased feedback, via the resistors 121 and 122, to the inverting input of the amplifier 50. The gain of the amplifier therefore depends upon the magnitude of the received signal, as mentioned previously.

The filtered received signal from amplifier 61 is fed via a capacitor 86 to a phase-locked-loop demodulator circuit 87. The demodulated output is filtered by a ladder network comprising resistors 88, 89 and 90 and capacitors 91, 92 and 93 and is thence fed to one input of an output comparator stage 94. The output of the latter stage is fed to an opto-coupler 95 which feeds the output digital data to data output terminals 96. The output from amplifier 61 is also fed through a capacitor 81 to a further rectifier circuit comprising diodes 82 and 83, a resistor 84 and a capacitor 85. The output of the rectifier circuit 82-85 is a d.c. level which varies with the magnitude of the received signal. This output is fed to a switching circuit, comprising transistors 97 and 98 which drives the other input of the comparator 94. The transistor 97 remains turned off, and the transistor 98 therefore fully on, if the received signal is below a threshold level of approximately 0.6 volt. The conducting transistor 98 then connects the −6v rail to the comparator 94 and thereby maintains a low (mark) condition at the output to prevent spurious signals from being fed from the output when no tone is being received.

The circuit described above overcomes a number of problems of the known modems, in that:

(a) No separate power supply is needed; the power for operating the modem is obtained from the transmission line. Hence if the voltage on the transmission line, and any apparatus already connected thereto, is intrinsically safe, the modem cannot cause any degrading of that situation. No inductive components are used, and hence no inductive energy is stored anywhere in the circuit. Although some quite large capacitors, such as the capacitors 20 and 21, are used, the circuit configuration is such that these capacitors cannot be discharged directly into the transmission line, even under reasonable fault conditions.

(b) The modem is connected to the data input and output equipment via opto-couplers, which will hold off a very high voltage. No path is therefore available for entry of dangerous voltages into the modem and thence onto the transmission line.

(c) The use of a comparatively large and cumbersome inductor or transformer is avoided by the use of the inductance simulation circuit.

(d) Due to the overall circuit configuration, the whole modem could be constructed as a single integrated circuit, with only a relatively few discrete components connected thereto. A single silicon chip can provide all of the amplifying devices for the entire modem duty.

(e) The modem can be driven by low energy data signals, such as are obtainable from a home computer or a portable data source. This is particularly beneficial for portable data logging and for handheld computers which have to be carried into hazardour locations where there may be the risk of ignition of flammable atmospheres by electrical sparks. A hand-held logging unit with self-contained batteries can be intrinsically safe, but needs to receive and/or transmit a data stream via a telecommunication line. The present circuit can take directly the low voltage output of the logging unit and, without the use of a further electrical supply, can transmit or receive information to or from a distant source.

The inductance simmulator circuit may be applied to data handling apparatus other than a modem where similar or analogous requirements as to power supply arise.

When a modem is used on a long telephone line or in a hazardous situation, it is vital to operate the modem with as low a power consumption as possible. Some telephone sytem regulations require that the voltage drop is less than 9 volts under certain circuit conditions, and this is a convenient voltage for operating intrinsically safe circuits.

FIG. 2 of the drawings shows a modification of the input arrangement of the modem of FIGS. 1A, 1B which allows a reduction in the voltage drop by omission of the rectifier bridge 4 and by changing the power supply circuit.

Referring to FIG. 2, in which components corresponding functionally to those of FIG. 1 have the same reference numerals as in FIG. 1, the line 3 is connected at the remote end to a safety barrier 100, if required, such as described in my British Pat. No. 977,913. Such a barrier may comprise shunt zener diodes 101 and 102 and series resistors 103 and 104 to limit the line voltage and current. The input terminals 1 and 2 of the modem are connected to the line 3, as before, However, the rectifier bridge 4 of FIG. 1, which is used to allow connection of the modem to a line on which the voltage may be of either polarity, can be omitted or replaced by an impulse relay 105 having double-pole change-over contacts 106, arranged to reverse the connections between the line 3 and input lines 8 and 107 on energisation of the coil 108 of the relay. The coil 108 is connected, in series with a zener diode 109, between the lines 8 and 11.

By use of a high current rating zener diode 110 connected between the lines 11 and 107, in place of the two zener diodes 9 and 10 of FIG. 1, the fuses 5 and 6 of FIG. 1 can be omitted. This diode circuit then provides a d.c. supply of, say, +5 volts between the lines 107 and 11 instead of the ±6 volt supplies of FIG. 1. The 5 volt supply is smoothed by a capacitor 111 connected across the diode 110.

The 5 volt supply is fed to a voltage converter chip 112, to which is connected a capacitor 113. The converter provides a −4.3 volt supply relative to the line 11, which now acts as the zero voltage line. The negative supply is smoothed by a capacitor 114.

The remainder of modem circuit is shown in FIG. 1, apart from the fact that the ±6 volt points will now be +5 volts and −4 volts, respectively.

The simulator circuit 12 requires a voltage drop of less than 4 volts, as mentioned previously, and there is a voltage drop of 5 volts across the modem zener diode 110, so the total voltage drop across the input is less than 9 volts.

The relay 105 operates in the following manner. The zener diode 109 is rated at, say, 20 volts, so that if a line voltage of the correct polarity appears on the line the diode 109 will not conduct, and the relay will not operate. The connections between the line 3 and the modem will therefore remain as shown. However, if the line voltage is reversed, substantially the whole of the voltage appears across the diode 109, which will therefore conduct and pass a current through the relay coil 108. The relay will pull up, changing over the connections. Since the relay is of the impulse type, the resultant de-energisation of the relay coil circuit will not cause reversal of the contact positions.

In place of the arrangement of the relay 105 and the zener diode 109, a solid state switch could be used.

The d.c. supply provided at the line 107 may be used for energising other apparatus, for example a microprocessor, in the hazardous area in addition to energising the circuits of the modem as described above.

Typically, the voltage on pilot wires 3 would be 24 volts and the resistance 10 ohms, so that a current of at least 100 mA could pass through terminals 1 and 2. The circuits described require not more than 15 mA, so that ample energy is available for powering a microprocessor of the 80C85 type, which is the basis of several hand-held computers.

I claim:

1. An inductance simulation circuit to be connected to a transmission line providing a line-holding direct current and carrying alternating data signals, the circuit being operative to exhibit a relatively low resistance to direct current flow between two points in the circuit whereby a d.c. power supply for energising data handling apparatus can be derived from said direct current flow and to exhibit a relatively high impedance for alternating signals occuring between those points, the circuit comprising resistance means connected between the points, and an amplifier circuit connected across the resistance means to provide a low resistance d.c. path in parallel with the resistance means and operative to amplify the alternating signals and to apply the amplified alternating signals across the resistance means in a phase such that the amplifier circuit simulates an inductance connected across the points.

2. A circuit as claimed in claim 1 wherein the amplifier circuit comprises at least one transistor.

3. A circuit as claimed in claim 2 wherein the amplifier circuit has a plurality of transistors connected in a Darlington configuration.

4. A circuit as claimed in claim 1 wherein the resistance means comprises a pi-section attenuation circuit, having one shunt branch connected across said points, a series branch having one of its ends connected to one of said points, and a further shunt branch connected between the other end of said series branch and the other of said points, and wherein the amplifier circuit is connected in parallel with said one shunt branch.

5. A circuit as claimed in claim 4 wherein said amplifier comprises transistor means having a base-collector circuit as its input branch with its base connected to one tapping point on a chain of resistors connected in parallel with said one shunt branch, and having a collector-emitter circuit as its output branch connected between one of said points and further tapping point on the resistor chain, the values of the resistors of said chain being selected to bias said transistor means to conduction and to provide amplification of an alternating current signal applied to the input branch for production of an in-phase amplified signal in the output branch.

6. A data handling apparatus to be connected to a transmission line including an inductance simulation circuit as claimed in claim 1, wherein said derived d.c. power supply is used for energising the apparatus.

7. Apparatus as claimed in claim 6 further comprising two zener diodes connected in series with the resistance means across the d.c. supply from the transmission line, to provide two said derived power supplies which are respectively positive and negative relative to the point of interconnection of the diodes.

8. Apparatus as claimed in claim 6 further comprising a zener diode connected in series with the resistance means to derive a first d.c. power supply having one polarity relative to the point of interconnection of the zener diode and the resistance means; and a voltage converter means connected to said first d.c. power supply to provide a second power supply of the opposite polarity relative to said point of interconnection.

9. Apparatus as claimed in claim 6 including means to allow connection of the apparatus to the transmission line so that the derived d.c. power supply is of a required polarity irrespective of the polarity of the d.c. supply on the transmission line.

10. Apparatus as claimed in claim 9 wherein the means to allow connection comprises a diode bridge to receive the d.c. supply from the transmission line across one of its diagonals, whereby said d.c. supply of a required polarity is obtained from across its other diagonal.

11. Apparatus as claimed in claim 9 wherein the means to allow connection comprises relay means having an operating coil, a zener diode connected in series with said coil across the resistance means, which zener diode maintains the coil unenergised if the d.c. supply on the transmission line is of said required polarity, and energises the relay coil if that d.c. supply is of the opposite polarity; said relay having contacts operated by energisation of the coil to reverse connections between said simulation circuit and said transmission line.

12. Apparatus as claimed in claim 6 including a data handling circuit which is operable to receive and/or transmit data items; and opto-coupler means to feed data to and/or from the data handling circuit.

13. Apparatus as claimed in claim 6 wherein the derived d.c. power supply also provides power for energising data circuits external to said apparatus.

14. Apparatus as claimed in any one of claims 6 to 13 wherein the data handling apparatus is to be connected between the line and a user's equipment and comprises a modem which modulates and demodulates the alternating signals.

* * * * *